(12) United States Patent
Townsend, II

(10) Patent No.: US 7,131,910 B2
(45) Date of Patent: Nov. 7, 2006

(54) GOLF SWING TRAINING TEMPLATE

(76) Inventor: Marshall O. Townsend, II, 3477 W. Elm Creek Dr., Meridian, ID (US) 83642

( * ) Notice: Subject to any disclaimer, the term of this patent is extended or adjusted under 35 U.S.C. 154(b) by 611 days.

(21) Appl. No.: 10/041,836

(22) Filed: Jan. 7, 2002

(65) Prior Publication Data

US 2003/0130055 A1    Jul. 10, 2003

Related U.S. Application Data

(60) Provisional application No. 60/285,928, filed on Apr. 25, 2001.

(51) Int. Cl.
A63B 69/36    (2006.01)
(52) U.S. Cl. .................. 473/278; 473/218; 473/407
(58) Field of Classification Search .............. 473/278, 473/218, 266, 270, 157, 290, 407
See application file for complete search history.

(56) References Cited

U.S. PATENT DOCUMENTS

| | | | | |
|---|---|---|---|---|
| 1,484,390 A | * | 2/1924 | Gibbs et al. ............ 283/115 |
| 1,596,110 A | * | 8/1926 | Lynch .................... 473/218 |
| 2,652,251 A | * | 9/1953 | Molinar .................. 473/218 |
| 2,707,638 A | * | 5/1955 | Manley ................... 473/218 |
| 3,429,577 A | * | 2/1969 | Godden ................... 473/265 |
| 3,542,369 A | * | 11/1970 | Anderson ................ 473/257 |
| 3,561,764 A | * | 2/1971 | Thomas ................... 434/252 |
| 3,580,584 A | * | 5/1971 | Trosko .................... 473/218 |
| 3,868,109 A | * | 2/1975 | Fowler .................... 473/218 |
| 4,023,810 A | * | 5/1977 | Lorang .................... 473/218 |
| 4,164,352 A | * | 8/1979 | O'Brien ................... 473/218 |
| 4,248,431 A | * | 2/1981 | Burnes .................... 473/270 |
| 4,355,810 A | * | 10/1982 | Rydeck ................... 473/218 |
| 4,765,625 A |  | 8/1988 | Miner |
| 4,826,174 A |  | 5/1989 | Hoyt, Jr. |
| 4,915,387 A | * | 4/1990 | Baxstrom ................ 473/218 |
| 5,163,686 A | * | 11/1992 | Bergman ................. 434/252 |
| 5,273,285 A | * | 12/1993 | Long |
| 5,306,011 A | * | 4/1994 | Perry ...................... 473/218 |
| 5,415,407 A | * | 5/1995 | Beatty |
| 5,482,284 A | * | 1/1996 | Vandever ................. 33/508 |
| 5,590,882 A | * | 1/1997 | Todd ...................... 473/218 |
| 5,628,694 A |  | 5/1997 | O'Connor, Jr. |
| 5,938,539 A | * | 8/1999 | Hamilton ................ 473/270 |
| 5,954,592 A | * | 9/1999 | Laffer et al. ............ 473/220 |
| 6,077,169 A | * | 6/2000 | Florian ................... 473/270 |
| 6,156,396 A | * | 12/2000 | Florian ................... 428/17 |
| 6,405,442 B1 |  | 6/2002 | Ratcliff |
| 6,503,152 B1 |  | 1/2003 | Pelz |
| 6,949,029 B1 | * | 9/2005 | Strande ................... 473/257 |

* cited by examiner

Primary Examiner—Nini F. Legesse
(74) Attorney, Agent, or Firm—Black Lowe & Graham, PLLC

(57) ABSTRACT

The present invention comprises a golf swing training device having a graphic design that illustrates a plurality of golf swing variables, including a club path indicator and a club face angle guide. The template is designed so that golfers may practice swinging a golf club over the top of the template to determine whether their swing follows a desired path. A swing reference guide is included and correlates shot selection, ball path, club path, and club face angle.

17 Claims, 2 Drawing Sheets

GOLF SWING TRAINING TEMPLATE

PRIORITY CLAIM

This application claims the benefit of provisional application Ser. No. 60/285,928, filed Apr. 25, 2001.

FIELD OF THE INVENTION

This invention relates generally to instructional sports equipment and, more specifically, to a golf swing instructional tool.

BACKGROUND OF THE INVENTION

Golf is a difficult sport in which slight swing errors can produce wildly undesirable results. Unfortunately, golfers do not always know the manner in which their swing deviated from the ideal. In an attempt to develop a better swing, many golfers turn to the countless books and other publications offering swing advice. Other golfers try some of the many gadgets that are intended to physically force or limit a golfer's swing to certain paths of motion in an attempt to develop a consistent swing. Neither written materials nor physical gadgets are able to provide the necessary feedback to allow a golfer to develop a consistent golf swing.

It is virtually impossible to develop a good swing solely by reading written coaching materials. The written text, even if accompanied by illustrations, does not provide a proper visual guide for replicating a desired golf swing when actually playing golf. The text of an article also does not allow golfers to actually experience what a proper swing feels like because there are no indicators to tell the golfers whether they are making the proper swing. Because learning a proper golf shot is largely an issue of developing the proper muscle memorization through repetition, an inability to feel a correct swing while training defeats the training. Worse yet, the muscles may actually train themselves to swing improperly because golfers repeatedly practice poor swings without knowing it.

The golf training gadgets currently on the market generally attempt to physically limit the range of motion during a swing. These gadgets often place golfers in uncomfortable positions in an attempt to fit all golfers into a single mold. The positions the golfers are forced into often result in a bad golf swing and potentially subjects golfers to injury associated with the unnatural form.

Another problem associated with present golf training gadgets is the social stigma associated with their use, at least for those training aids that are awkward, cumbersome, or overt. Still other training devices are large and inconvenient, expensive and inaccessible, or difficult to use in a variety of practice settings. Accordingly, there is a need for an improved golf training aid that provides the desired feedback to develop a consistent golf swing.

SUMMARY OF THE INVENTION

The present invention is a golf swing training device. The training device includes a template having a graphic design that depicts a plurality of golf swing variables. In its preferred form, the graphic design includes a club path indicator showing several possible swing paths though and beyond the ball location. It also includes a club face angle guide illustrating a plurality of angles—closed, square, and open—at which a club face may strike a ball. Additional markings show a desired take-away path and a preferred position of the hands at ball impact.

In accordance with other aspects of the invention, the graphics include a swing reference guide that correlates shot selection, ball path, club path and club face with the flight of the ball. The guide allows golfers to determine the swing path and club face from the flight of the ball so that erroneous swings can be corrected.

In accordance with still other aspects of the invention, the template is preferably constructed from an impact resistant plastic that is coated to limit degradation due to ultraviolet radiation.

In accordance with yet other aspects of the invention, the preferred template includes a handle so that the template can be carried easily.

In accordance with additional aspects of the invention, the template includes a tee bore that extends through the template and serves as a ball locator. Any of a variety of tees or other ball holders can be extended through the bore.

The present invention further includes a method of training golfers to swing a golf club to achieve a desired ball path. Golfers can practice swinging with or without a ball and can observe whether their swing follows one of several swing paths depicted on the template. By repeating this process, golfers develop the proper "muscle memory" to reproduce a desired golf shot any time they want.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
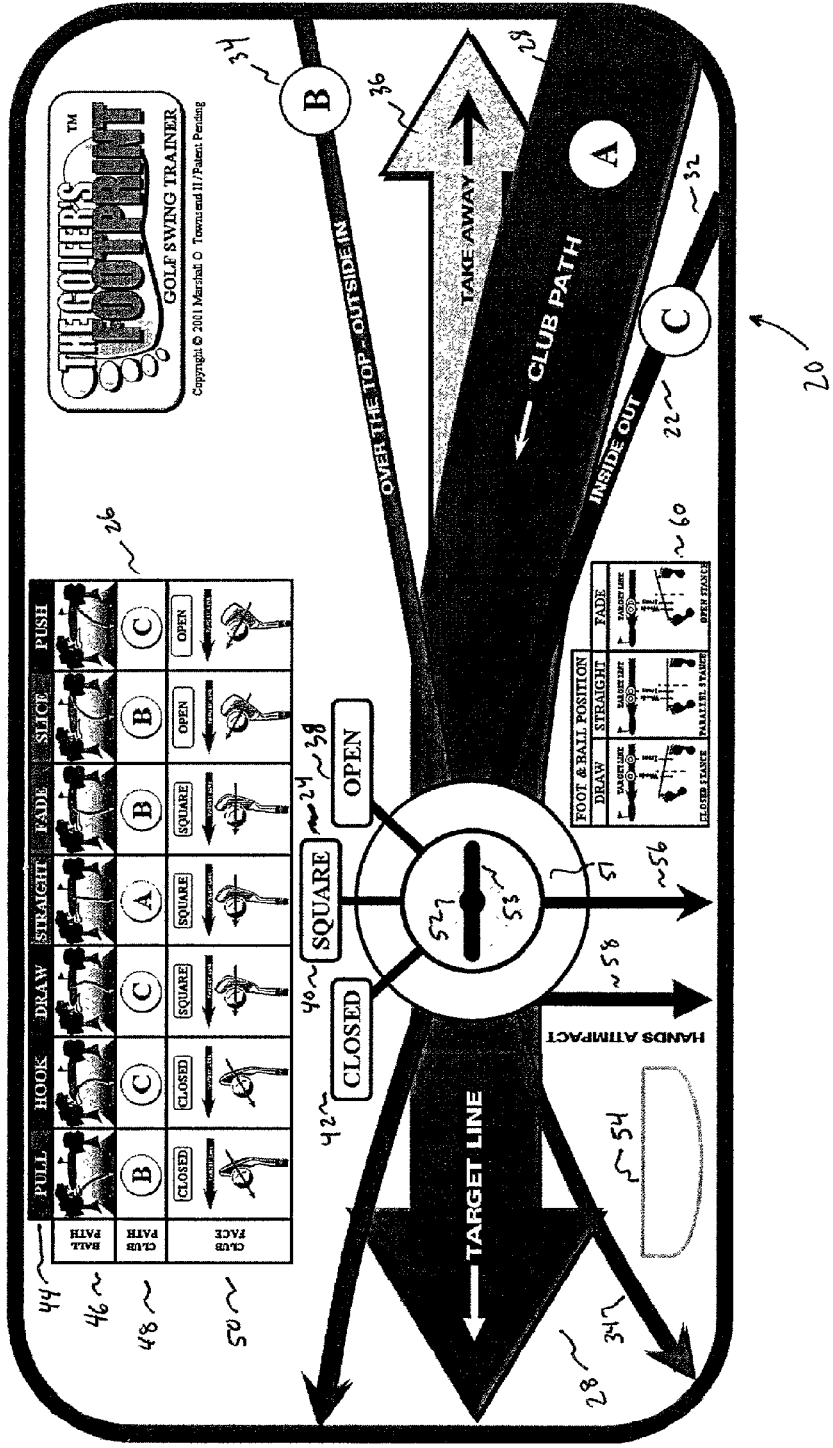
FIG. 1 is a top view of a golf swing training template.

The present invention provides a system and method for developing a golf swing for a variety of desired ball paths. The preferred embodiment focuses on four aspects of the golf swing: Club Path, Target Line, Club-face-angle, and Club Head Impact. With reference to FIG. 1, a preferred embodiment of the present invention includes a portable golf swing template 20 including club path indicator 22 used to illustrate the proper club path for a specific shot; a club face angle guide 24 used to indicate the angle of the club face at impact with a ball centered at a tee bore 52; and a swing reference guide used to reference the proper club path and club face angle to achieve the desired ball path or to assist in determining the club path and face angle that produced an observed ball flight. The structure and operation of the template 20 is described in more particularity below.

FIG. 1 depicts the golf swing template 20. For ease of discussion, only the right-hand version is disclosed, however, a left-hand version, with reversed graphics, is within the scope of this invention. Likewise, a single template may include right-hand graphics on one side and left-hand graphics on the other.

A handle 54 is provided so that an individual may easily carry the template 20 by the handle 54. Preferably, the handle is comprised of an opening at an outer edge of the template that is sized and shaped to accommodate a hand.

While a single handle is preferred, multiple handles may be included. Likewise, other forms of handles such as finger holes or attached handles rather than holes are possible.

The template 20 is preferably made of a clear, high impact plastic that has been treated to minimize ultraviolet degradation. A graphic design is attached to the template 20. The graphic design includes a club path indicator 22, club face angle guide 24, a swing reference guide 26, and a foot and ball position reference guide 60. The graphic design is preferably attached to the backside of the template so that it will not be scratched or marked during use. However the graphic design may be located anywhere on the template 20, for example on the top surface or laminated within the template 20. Additionally, the graphics employ a variety of colors to make visualizing a proper golf stroke an easier task. In alternate embodiments, the graphic design is applied to the template via decals, painting, etching, or any other form of marking. The graphics are described in more detail below.

The club path indicator 22 includes a primary club path 28, an inside-out path 30, an outside-in path 32 and a take away path 34. Each club path intersects with the others at a ball position indicated by the tee bore 52. The various club paths are individually colored for visualization purposes.

A primary club path 28 is shown, in a preferred embodiment, as a wide red arrow to allow the golfer to see the contrast between it and the clubface as the clubface moves along the path. The primary club path 28 is labeled "A" to provide a link between it and the swing reference guide 26, discussed in more detail below. The primary club path 28 is approximately 2½ inches wide to assist in visualizing the clubface path during the swing. The path 28 traces a slight inside approach to the ball and a straight line from the ball location to the edge of the template in a direction of the intended ball flight.

An outside-in path 34, also known as an over the top path, is preferably shown as a green arrow. It is labeled "B" to provide a link to the swing reference guide 26. The width of the arrow indicating the outside-in path 34 is narrower than the primary club path 28. However, the club path 34 is wide enough to generate awareness of the club path 34, while not overly distracting the player from the primary club path 28. The outside-in club path 34 also allows a more advanced golfer to replicate this club path (along with a square club face) to hit a fade.

The inside-out club path 32, also know as a cutting the corner path, is preferably depicted by a blue arrow. The inside-out club path 32 is labeled "C" to provide a link to the swing reference guide. The width of the path-indicating arrow of the inside-out club path 32 is substantially the same as the path-indicating arrow of the outside-in club path 34. The inside-out club path 32 also allows a more advanced golfer to replicate this club path to hit a draw.

The take-away club path 36 is preferably depicted as a light blue arrow. The take away club path 36 provides a visual guide to the golfer as to the proper club path direction of the take-away at the start of the golf swing. The light blue color contrasts with the red primary club path 28 indicating arrow, and also shows that the primary club path 28 is slightly different than the take-away club path 36. Though the preferred embodiment uses red, blue, green, and light blue to provide visual contrasts, other color combinations, or even the same color for all of the club paths, may also be used.

A circular ball locator 51, having a substantially centrally located tee bore 52, is positioned at the intersection of the club path indicator arrows. The ball locator 51 is preferably yellow in color to contrast with a golf ball (not shown) and make it easier to visualize the ball's location in the clubface's path. The tee bore 52 is designed to receive either a golf tee (such as a standard wood or plastic tee, surgical tubing, or other ball holding device) or to directly cradle a golf ball without a tee. Consequently, the tee bore 52 allows the golfer to use any golf club with the golf swing template 20. In alternate embodiments, the tee bore may be replaced by any ball-holding device such as a permanently or removably affixed tee.

A tee slot 53 extends through the template 20 and runs generally parallel to the target line and perpendicular to the lines indicating the hands at impact 58 and foot locator 56. The tee slot 53 preferably extends a short distance on either side of the tee bore 52, both toward the target line 28 and the take away line 36. The purpose of the tee slot 53 is to allow a standard golf tee to tilt forward and kick up when the ball is struck, thereby preventing the tee from breaking if the tee slot 53 is not included.

The ball locator 51 also includes the club face angle guide 24. The club face angle guide 24 includes radially extending hash marks surrounding the tee bore 52, and their corresponding textual description depicting the different club face angles at the moment of ball contact. More specifically, the open, closed, and square club face positions, 38, 40 and 42, respectfully, are depicted.

Through the center of the ball locator 51 is a foot locator 56. The foot locator 51 assists the golfer in aligning his or her feet and body relative to the ball. While the foot locator 56 is preferably a line extending through the tee bore 52 and perpendicular to the take away path, it may be placed in other positions and can comprise multiple lines rather than a single line. In addition, the foot locator 56 in the preferred embodiment is not meant to indicate a position for the feet on every shot, but rather to provide a reference point so that the golfer can readily determine where the ball is placed relative to the stance.

A hand locator 58 is also graphically indicated on the template 20. The hand locator 58 indicates the most common location of the golfer's hands at impact. The hand locator is forward of the ball to aid in generating a downward force as the golfer makes impact with the ball. As with the foot locator 56 discussed above. The specific location of the golfer's hands during impact may vary. The hand locator 58, like the foot locator 56, is present to provide a frame of reference from which a golfer may analyze their golf swing.

Figures 2, 3:
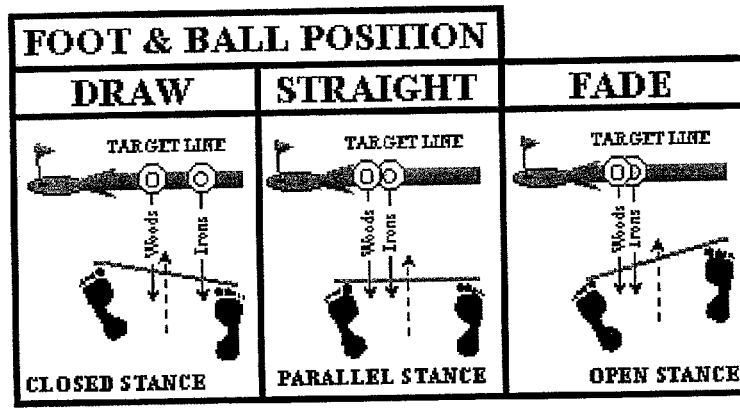
FIG. 2 is a detailed view of a foot and ball position reference guide portion of a preferred golf swing training template.
FIG. 3 is a detailed view of a swing reference guide portion of a preferred golf swing training template.

The golf swing template 20 also includes a swing reference guide 26, best seen in FIG. 3. The swing reference guide 26 provides a tabular reference for shot selection 44, ball path selection 46, club path selection 48 and club face selection 50. The guide 26 is printed in large print and colors that correspond to the club path indicators 22 to assist in cross-referencing the ball's flight back to the club path 22 and club face angle 24.

While the swing reference guide 26 is described in the preferred embodiment as a tool for determining a swing path and club face to produce a desired shot, it may also work in reverse. That is, a golfer may use the guide, after hitting a shot, to determine the swing path and club face of the club at impact. Thus, while the guide is described as including a "shot selection" area, when used in reverse the shot selection becomes a shot result. The graphic itself, however, is the same in either convention. Moreover, the preferred embodiment depicts only a subset of the possible combinations of swing path and club face. For example, not shown are ball flight possibilities for a preferred swing path in combination with an open or closed club face. The swing guide may alternatively depict a different subset or can include all combinations.

The golf swing template also includes a foot and ball position guide 60, best seen in FIG. 2. The foot and ball position guide 60 provides a tabular reference for shot selection 62 and the corresponding foot and ball position 64 to accomplish the selected shot. The foot and ball position depiction 64 graphically illustrates the relative positions of the golfer's feet with respect to the ball and the target line.

To use the device, the golfer places the golf swing template 20 on the spot from which he or she intends to hit a ball. The golfer selects a golf club to use and chooses to tee-up the ball or place the ball directly on the template 20. To tee-up the ball, the golfer places a tee through the tee bore 52 and places the ball on the tee. Without the tee, the golfer simply places the ball on the tee bore 52 so that the tee bore 52 prevents the ball from rolling away.

The golfer then takes up a desired stance, based on club choice, relative to the foot locator 56 to align his or her feet and body to the ball. The golfer then conducts a normal golf swing. He or she takes the club back along the take-away path 36, and then returns the club back to the ball along the desired club path, 28, 32 or 34. As the golfer conducts the golf swing, he or she compares the club path to the club path indicators 22 to see which path the club really took as it returned to the ball. In this way, the golfer can visually verify the club path before, during, and after ball impact. Through repetition, the golfer can adjust his or her golf swing to correct for a wrong club path. This adjustment to the swing path can be accomplished with or without a golf ball being placed on the template 20. The drill can be accomplished indoors or outdoors.

In addition to the club path, the golfer can also check the club face angle at impact by referring to the club face angle guide 22. The club face angle may also be pre-positioned as the golfer sets up for the golf swing. In this way, the golfer can get a before, during, and after visualization of the clubface angle. The golfer can better visualize and correct faulty club face angle during this process. As stated above, this process can be accomplished inside or outside, with or without a golf ball.

Once the ball has been struck, the golfer can observe the path of the ball in flight. Based on the ball's path, the golfer can use the swing reference guide 26 to quickly cross-reference the club path and clubface angle that generated the ball's path. This process provides immediate feedback for the golfer as to what caused the ball's flight and how to correct the problem. Because the golfer is hitting directly off of the training device, he or she can quickly tee-up another ball and correct the mistakes; there is no need to pull out a reference book or ask for an external evaluation.

One of the key elements of the golf swing template 20 is that the training device allows the golfer to hit a golf ball directly off of the product. The combination of visual cues for the club path, clubface angle and the effects on the ball's path provides a powerful learning tool for the golfer. Golfers, from beginners to advanced, can take advantage of the golf swing template 20 to shape their golf swings through multiple repetitions of hitting off of the device. Additionally, by simply standing over the swing trainer, the golfer can see the proper club path and mentally practice his or her swing. Because the device is portable and lightweight, the golfer can take it anywhere and use it anywhere, to include hotel rooms, the back yard, or the driving range. The device is effective and understandable for all ages.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A golf swing training device, comprising:
    a template, the template having a top and a bottom and defining a tee bore; and,
    a graphic design attached to the template, the graphic design depicting (i) a plurality of club path indicators, the club path indicators each comprising an arcuate club path, the arcuate club paths crossing one another at a point of intersection proximate the tee bore, the arcuate paths mapping club head paths of club heads striking a golf ball positioned on a golf tee positioned within the tee bore, the club head paths corresponding to at least two golf ball paths distinct from one another as corresponding to different one or more members of the group consisting of a pull, a hook, a draw, a straight, a fade, a slice, and a push and (ii) a swing reference guide comprising a plurality of shot selection types, and (iii) a link between each one of the plurality of shot selection types and one of the club path indicators, and
    a tee bore extending through the template and a generally longitudinal tee slot extending from the tee bore in a direction radially outward from the tee bore.

2. The device of claim 1, wherein the graphic design further depicts a foot and ball position guide.

3. The device of claim 2, further comprising a club face angle guide, the club face angle guide comprising a plurality of hash marks extending radially outward from the tee bore.

4. The training device of claim 1, wherein the club path indicators include at least one of a primary club path, inside-out club path, outside-in club path or take away club path indicator.

5. The training device of claim 1, wherein the swing reference guide further comprises a club face angle indicator associated with each of the shot selection types.

6. The training device of claim 1, further comprising a club face angle indicator having at least one of an open club face, closed club face or a square club face indicator.

7. The training device of claim 1, wherein the template is constructed of impact resistant plastic and coated with an ultraviolet protective layer.

8. The training device of claim 1, further comprising a handle.

9. The device of claim 1, wherein the graphic design is attached to a top surface of the template.

10. The device of claim 1, wherein the graphic design is laminated within the template.

11. The device of claim 1, wherein the link comprises a first insignia associated with at least one of the plurality of shot selection types and a corresponding insignia associated with at least one of the club path indicators.

12. The device of claim 11, wherein the first insignia and corresponding insignia each comprise an alphanumeric character.

13. The device of claim 1, wherein the link comprises the use of a plurality of colors, such that each of the club path indicators is formed in a color that is substantially the same as a color used for at least one shot selection type.

14. The device of claim 1, wherein the graphic design further comprises a club face angle indicator centered on the point of intersection, the club face angle marker including markings corresponding to face angles for at least one of an open club face, closed club face and a square club face.

15. A golf swing training device, comprising:
a template, the template having a top and a bottom and defining a tee bore for receiving a golf tee; and,
a graphic design attached to the template, the graphic design depicting (i) a plurality of club path indicators, the club path indicators each comprising an arcuate club path, the arcuate club paths crossing one another at a point of intersection proximate the tee bore, the arcuate paths mapping club head paths of club heads striking a golf ball positioned on a golf tee positioned within the tee bore, the club head paths corresponding to at least two golf ball paths distinct from one another as corresponding to different one or more members of the group consisting of a pull, a hook, a draw, a straight, a fade, a slice, and a push and (ii) a club face angle indicator centered on the tee bore, the club face angle marker including markings corresponding to face angles for at least one of an open club face, closed club face and a square club face; and
a generally longitudinal tee slot extending from the tee bore in a direction radially outward from the tee bore.

16. The device of claim 15, wherein the graphic design further comprises a club face angle indicator centered on the point of intersection, the club face angle marker including markings corresponding to face angles for at least one of an open club face, closed club face and a square club face.

17. The device of claim 16, wherein the club face angle indicator includes an inner and an outer circle centered on the tee aperture, a first portion of the outer circle representing a striking target position corresponding to a swing imparting back spin to the golf ball, a second portion of the outer circle on an opposite side of the tee aperture representing a striking target position corresponding to a swing suitable for sand.

* * * * *